(12) United States Patent
Ray (10) Patent No.: US 11,967,229 B1
(45) Date of Patent: Apr. 23, 2024

(54) SYSTEMS AND METHODS FOR MONITORING VEHICULAR TRAFFIC

(71) Applicant: Board of Trustees of the University of Alabama, for and on behalf of the University of Alabama in Huntsville, Huntsville, AL (US)

(72) Inventor: Biswajit Ray, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 425 days.

(21) Appl. No.: 16/853,200

(22) Filed: Apr. 20, 2020

Related U.S. Application Data (60) Provisional application No. 62/836,269, filed on Apr. 19, 2019.

(51) Int. Cl.
| | |
|---|---|
| G08G 1/052 | (2006.01) |
| G08G 1/01 | (2006.01) |
| G08G 1/04 | (2006.01) |
| H02S 20/21 | (2014.01) |

(52) U.S. Cl.
CPC .......... *G08G 1/052* (2013.01); *G08G 1/0104* (2013.01); *G08G 1/04* (2013.01); *H02S 20/21* (2014.12)

(58) Field of Classification Search
None
See application file for complete search history.

(56) References Cited

U.S. PATENT DOCUMENTS

| | | | |
|---|---|---|---|
| 3,685,012 A * | 8/1972 | Case | G08G 1/0104 348/149 |
| 5,537,110 A * | 7/1996 | Iida | G08G 1/04 340/933 |
| 5,910,817 A * | 6/1999 | Ohashi | G08G 1/04 348/160 |
| 7,042,369 B2 * | 5/2006 | Hill | E01F 11/00 340/936 |
| 7,190,306 B2 * | 3/2007 | Janssen | G01S 13/92 342/134 |
| 7,427,930 B2 | 9/2008 | Arnold et al. | |
| 7,518,260 B2 | 4/2009 | Dai et al. | |
| 7,696,903 B2 | 4/2010 | Stam et al. | |
| 7,701,363 B1 | 4/2010 | Zlojutro | |
| 8,120,513 B2 | 2/2012 | Ioli | |

(Continued)

*Primary Examiner* — Thomas E Worden
(74) *Attorney, Agent, or Firm* — Butler Snow LLP; Jon E. Holland (57) ABSTRACT

A traffic monitoring system has a controller and sensors placed in or on roads such that vehicles pass over or near the sensors, thereby casting shadows on the sensors as they pass. The sensors may be configured to detect the shadows, and a controller may be configured to determine any of a variety of information about the passing vehicles based on the detected shadows. For example, the controller may count the number of vehicles that pass, determine a speed of each passing vehicle, and determine a length of each passing vehicle. The sensors can be relatively inexpensive so that a relatively large number of sensors can be used to monitor a large area at a relatively low cost. In some embodiments, solar cells are used to power the sensors, and if desired, the solar cells may be used as the sensors for detecting the shadows of the vehicles being monitored.

20 Claims, 8 Drawing Sheets

(56) References Cited

U.S. PATENT DOCUMENTS

| | | | |
|---|---|---|---|
| 8,134,693 B2 | 3/2012 | Ciolli | |
| 8,340,356 B2 | 12/2012 | Lehning | |
| 8,368,559 B2 | 2/2013 | Pixley | |
| 9,129,526 B2 | 9/2015 | Walther et al. | |
| 9,224,293 B2 | 12/2015 | Taylor | |
| 9,275,545 B2 | 3/2016 | Hart | |
| 9,564,047 B2 | 2/2017 | Wu | |
| 9,595,192 B1 | 3/2017 | Alrashid | |
| 9,836,967 B2 | 12/2017 | Jeschke et al. | |
| 10,019,895 B2 | 7/2018 | Xiang | |
| 10,029,613 B2 | 7/2018 | Chollet | |
| 2010/0208071 A1* | 8/2010 | Takahashi | G08G 1/04 348/148 |
| 2017/0019976 A1* | 1/2017 | Rajagopalan | G01S 17/04 |
| 2022/0121606 A1* | 4/2022 | Heldeis | G06F 13/4221 |

\* cited by examiner

SYSTEMS AND METHODS FOR MONITORING VEHICULAR TRAFFIC

CROSS REFERENCE TO RELATED APPLICATION

This application claims priority to U.S. Provisional Patent Application No. 62/836,269, entitled "Long-Distance Traffic Monitoring Using Solar-Powered Road Marker" and filed on Apr. 19, 2019, which is incorporated herein by reference.

RELATED ART

Monitoring traffic is an important service in many metropolitan areas and on freeways and other roads. Current systems for monitoring traffic often include camera systems that are expensive, difficult to build, and difficult to maintain. While these systems provide a wealth of information, their cost and other difficulties tend to limit their use and therefore the amount of traffic monitoring that is available. Reliable and less expensive techniques for monitoring traffic are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2b illustrates a side view of the sensor depicted by FIG. 2a.

DETAILED DESCRIPTION

The present disclosure generally pertains to systems and methods for monitoring vehicular traffic. In some embodiments, a traffic monitoring system monitors vehicular traffic on a roadway using low cost and low power sensors. These sensors may have a relatively small form factor allowing them to be placed in or on roads such that vehicles pass over or near the sensors, thereby casting shadows on the sensors as they pass. The sensors may be configured to detect the shadows, and a controller of the system may be configured to determine any of a variety of information about the passing vehicles based on the detected shadows. As an example, the controller may count the number of vehicles that pass, determine a speed of each passing vehicle, determine a length of each passing vehicle, and/or determine other information about the passing vehicles. The sensors can be relatively inexpensive so that a relatively large number of sensors can be used to monitor a large area at a relatively low cost. In some embodiments, solar cells are used to power the sensors, thereby reducing maintenance expenses, and if desired, the solar cells may be used as the sensors for detecting the shadows of the vehicles being monitored. Thus, the systems and methods described herein may be used to provide a relatively inexpensive, real-time, self-powered sensor platform for recording and providing traffic information (e.g., speed and volume).

Figure 1:
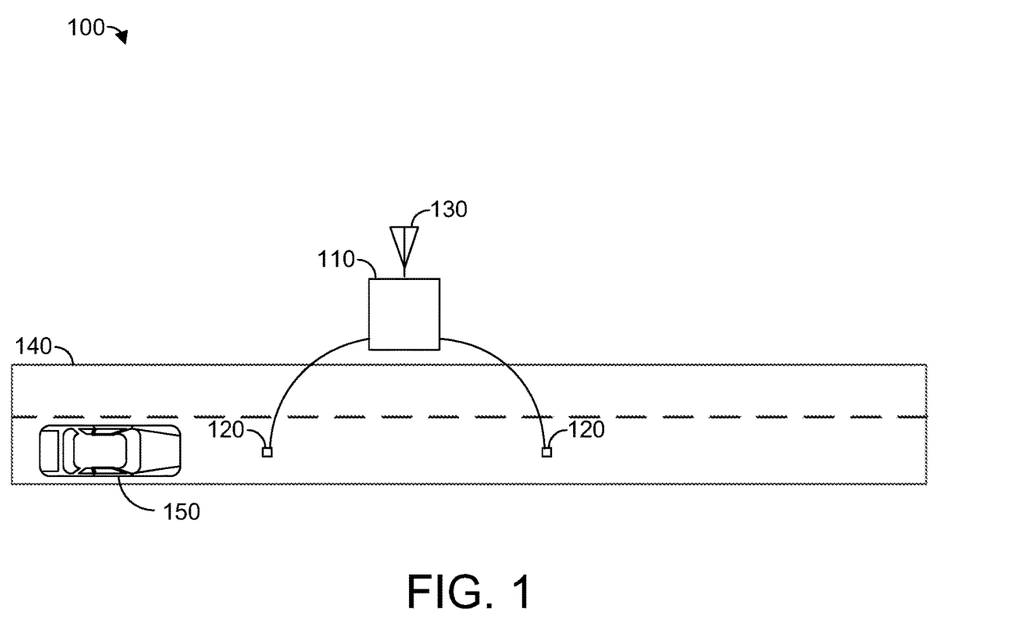
FIG. 1 is a diagram illustrating an exemplary embodiment of a traffic monitoring system.

FIG. 1 is a diagram illustrating an exemplary traffic monitoring system 100. The traffic monitoring system 100 depicted by FIG. 1 comprises one or more sensors 120, a controller 110, and a communication interface 130. In some embodiments, each sensor 120 is configured to sense light or, in other words, is a photosensor. As an example, a sensor 120 may comprise at least one photodiode or solar cell (e.g., an array of solar cells) that is configured to provide an output that varies proportionately to the amount of light that is received by the sensor 120. The sensors 120 are preferably positioned such that a passing vehicle 150 casts a shadow on the sensors 120 as it passes the sensors 120.

As an example, in FIG. 1, the sensors 120 are positioned near the middle of a lane through which the vehicle 150 travels so that the vehicle 150 passes over the sensors 120 as it travels. Each sensor 120 may detect the presence of the vehicle 150 by detecting the vehicle's shadow. That is, when the vehicle 150 is over a sensor 120, the amount of light sensed by the sensor 120 significantly decreases due to the vehicle's shadow, thereby enabling the vehicle 150 to be detected. In other embodiments, other types of sensors 120 may be used to detect a vehicle 150. As an example, a sensor 120 may be implemented as an ultrasonic sensor that is configured to emit ultrasonic waves that reflect from and are measured by the sensor 120 as the vehicle 150 passes. Yet other types of sensors 120 are possible in other embodiments.

The sensors 120 can be used to determine various information. For example, a sensor 120 can be used to count vehicles 150. One or more sensors 120 can be used in determining a vehicle's speed. As an example, multiple sensors 120 may be placed in a line or within the same lane of a road 140, and the time for the vehicle 150 to travel from one sensor 120 to another sensor may be used to calculate the vehicle's speed. In a preferred embodiment, the sensors 120 are placed near the middle of a traffic lane to detect vehicles 150 that drive over the sensors 120. In other embodiments, other locations are possible. As an example, the sensors 120 may be positioned on or in road reflectors that are positioned between two lanes for the purpose of helping drivers to distinguish one lane from the next lane. Road reflectors incorporating the sensors 120 may be placed in other locations as may be desired. As an example, some road reflectors are placed within a lane to mark a placement of a fire hydrant.

In the embodiment depicted by FIG. 1, a vehicle 150 traveling down the road 140 passes over two sensors 120. The sensors 120 transmit sensor data to a controller 110 that can process the information and may transmit the sensor data or processed data by use of a communication interface 130 to a remote server 200 (see FIG. 3). As an example, the remote server 200 may collect data from several systems 100 for a geographic region and determine various information about traffic in the region. For example, the remote server 200 may determine the number of vehicles that travel in certain areas, the average speed of vehicles in certain areas during certain times of the day, and other vehicular statistics.

To determine some information, such as the speed of a detected vehicle 150, according to some algorithms, it may be desirable for the controller 110 to know when the same vehicle is located at each sensor 120. In addition, to help prevent false vehicle detections, it is desirable for the controller 110 to distinguish shadows from vehicles 150 relative to shadows from other objects, such as clouds or trees. In some embodiments, the controller 110 is configured to analyze the sensor data from multiple sensors 120 to identify a signature of a given vehicle in the sensor data, thereby enabling the controller 110 know precisely when the same vehicle 150 is over or otherwise in close proximity to each sensor 120.

Using such information, the controller 110 may calculate the time for the vehicle 150 to travel from a first sensor 120 to a second sensor 120 by determining the difference in time between a point in the signature of the vehicle 150 at the first sensor 120 and a corresponding point in the signature of the vehicle 150 at another sensor 120, as will be described in more detail below. Knowing such time and the distance between the sensors 120, the controller 110 can calculate the vehicle's speed, where speed is equal to the distance divided by the delay for the vehicle to travel from one sensor 120 to the other sensor 120. After determining the vehicle speed, the controller 110 may determine other information. For example, the controller 110 may use the vehicle speed and the duration of the vehicle signature to calculate or otherwise determine the vehicle's length, as will be described in more detail below.

Figure 2A:
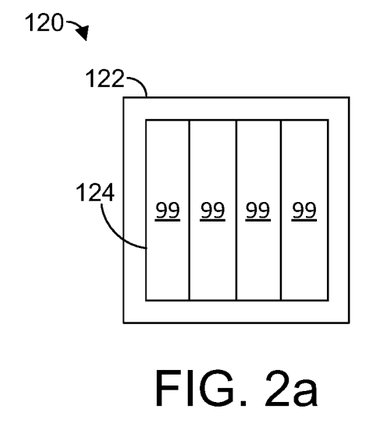
FIG. 2a illustrates a top view of an exemplary embodiment of a sensor of a traffic monitoring system, such as is depicted by FIG. 1.

FIGS. 2a-d are diagrams illustrating exemplary sensors 120 of the traffic monitoring system 100 of FIG. 1. FIG. 2a illustrates a top view of an exemplary flat sensor 120. The flat sensor 120 may have a thin protective housing 122 and a solar panel 124 comprising an array of solar cells 99 formed on a flat surface of the sensor 120. The sensor 120 of FIG. 2a also has a mounting shaft 126 (FIG. 2b), which may be inserted into the asphalt or other material of the road 140 to secure the sensor 120 to the roadway. In some embodiments, the solar panel 124 is used both to power the circuitry of the sensor 120 and to function as a photosensor by providing an output signal that is indicative of the amount of light received by the solar panel 124. In some embodiments, a sensor 120 may optionally include a photodiode or other type of photosensor for detecting light, and such photosensor may be powered by current from the solar panel 124. In yet other embodiments, other types of sensors, such as one or more proximity sensors or ultrasonic sensors may be used to detect vehicles 150. In some embodiments, the sensor 120 may be placed in a slight depression of the road 140 such that the top of the sensor 120 is flush with the surface of the road 140 or just above or below the road 140.

Figure 2B:
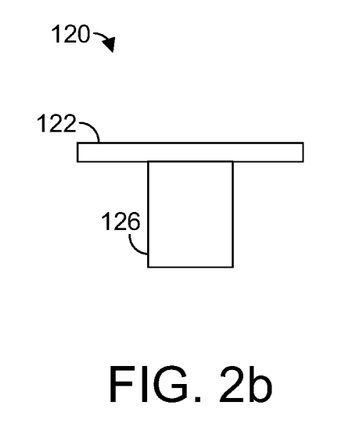

FIG. 2b is a side view of the flat sensor 120 depicted by FIG. 2a. The protective housing 122 is formed on the mounting shaft 126. In some embodiments, additional components for the sensor 120 may be stored within the mounting shaft 126. For example, at least one battery (e.g., a rechargeable battery that is coupled to and recharged by power from the solar panel 124), circuitry, or at least one communication interface (e.g., a transceiver for transmitting sensor data to the controller 110) may reside within the mounting shaft 126. The mounting shaft 126 is preferably shaped with a relatively long longitudinal axis to help secure the sensor 120 in the road 140. The shaft 126 may have any shape, as may be desired. Circuitry and other components, such any of the components mentioned above, may also be stored in the protective housing 122. As noted above, the flat sensor 120 may be installed in various places (e.g., in or near the middle of a traffic lane as shown in FIG. 1).

Figure 2C:
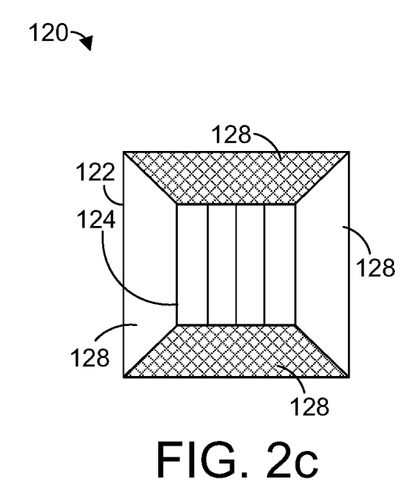
FIG. 2c illustrates a top view of another exemplary embodiment of a sensor of a traffic monitoring system, such as is depicted by FIG. 1.

FIG. 2c illustrates a top view of a reflective road marker sensor 120. The reflective road marker sensor 120 is similar in many ways to the flat sensor 120 of FIG. 2a except as otherwise described below. A top of the reflective road marker sensor 120 is shaped to provide multiple faces (e.g., in the illustrated figure the top has five faces: four inclined faces 128 and a flat face in the middle of the four inclined faces 128). At least one of the inclined faces 128 may be reflective to reflect light from headlights of vehicles 150 at night or in dark conditions. In the embodiment shown by FIG. 2c, two of the inclined faces 128 are reflective as indicated by the cross-hatched regions, but any of the inclined faces 128 may be reflective as may be desired.

Figure 2D:
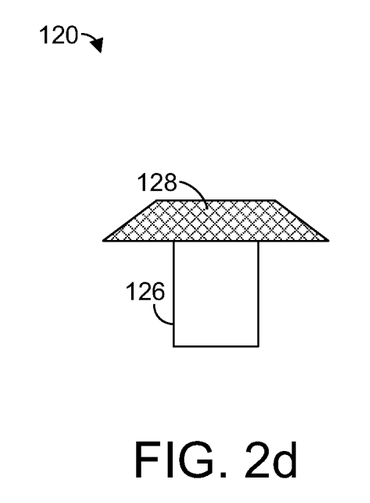
FIG. 2d illustrates a side view of the sensor depicted by FIG. 2c.

The top of the reflective road marker sensor 120 may have a housing 120 and a solar panel 124 that forms a flat face between the inclined faces 128. Each reflective region 128 may be the same color or different colors (e.g., different colors on different sides for instance indicate permitted and unpermitted directions). The design of the reflective road marker sensor 120 may allow the sensor 120 to replace or be used in place of existing road markers. FIG. 2d illustrates a side view of the reflective road marker sensor 120 depicted by FIG. 2c.

Figure 3:
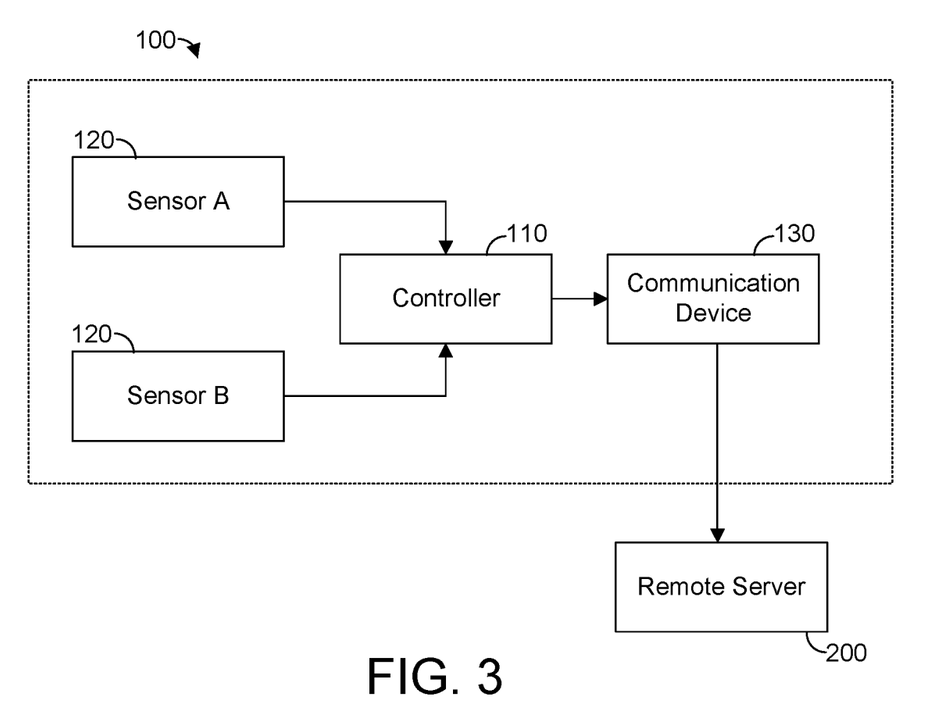
FIG. 3 is a block diagram illustrating an exemplary embodiment of a traffic monitoring system, such as is depicted by FIG. 1.

FIG. 3 is a block diagram illustrating an exemplary traffic monitoring system 100. The traffic monitoring system 100 comprises a plurality of sensors 120, a controller 110, and a communication interface 130, and the sensors 120 are communicatively coupled to the controller 110. In some embodiments, the controller 110 is integrated with the circuitry of one of the sensors 120 and may be housed by the sensor's housing. In other embodiments, the controller 110 may be external to the sensor housing. As an example, the controller 110 may reside off of the road 140 (e.g., near a shoulder of the road 140) and receive data from the sensors 120. In this regard, each sensor 120 may have a communication interface (not shown), such as a transceiver that transmits information (e.g., sensor data) to the controller 110 wirelessly or via a physical medium, such as one or more wires or optical fibers (not shown). It is possible for the controller 110 also be at a remote location from the sensors 120 and receive information from the sensors 120 through a network, such as a cellular network and/or the Internet.

The communication interface 130 comprises one more communication devices (e.g., transceivers) for transmitting data. As an example, the communication interface 130 may comprise a radio frequency (RF) transceiver for communicating wireless signals. In some embodiments, the communication interface 130 may comprise a cellular transceiver for communicating data to a remote location. Other types of devices may be used for the communication interface 130 in other embodiments.

In some embodiments, each sensor 120 shown by FIG. 3 comprises a solar panel 124 (FIGS. 2a-d) that provides electrical power for other components of the sensor 120. As an example, if the controller 110 is within the housing of the sensor 120 or otherwise coupled to the circuitry of a sensor 120, the controller 110 may be powered by current from the solar panel 124. For example, the controller 110 or circuitry of a sensor 120 may be powered by a rechargeable battery that is recharged by current from the solar panel 124. In other embodiments, the controller 110 or circuitry of a sensor 120 may receive electrical power from other sources. Note that the use of solar panels 124 is unnecessary. For example, it is possible to implement a sensor 120 with a photodiode and associated circuitry powered by a replaceable battery. Yet other configurations are possible in other embodiments.

Figure 4:
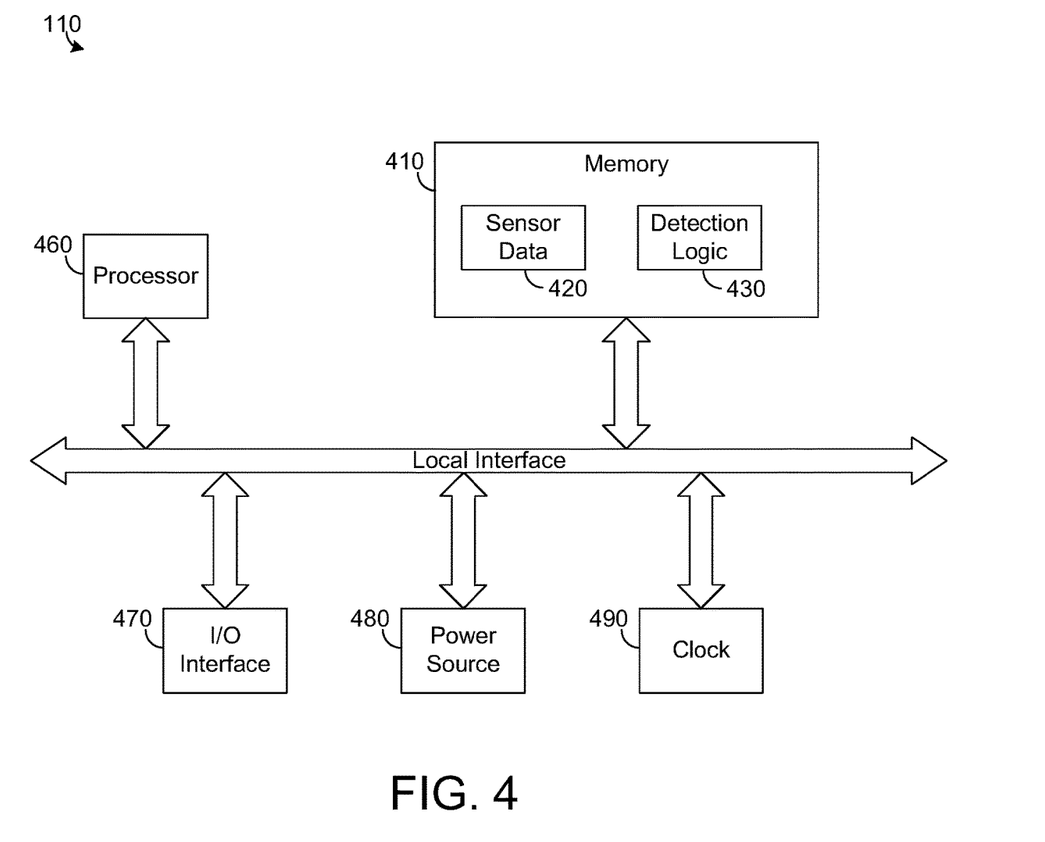
FIG. 4 is a block diagram illustrating an exemplary embodiment of a controller for a traffic monitoring system, such as is depicted by FIG. 3.

The controller 110 may be implemented in hardware (e.g., an application-specific integrated circuit (ASIC) or a field programmable gate array (FPGA)) or some combination of hardware, software, and/or firmware. As an example, the controller 110 may comprises one or more processors for executing software and/or firmware to perform the functions described herein for the controller 110. FIG. 4 illustrates an exemplary embodiment of a controller 110 for the traffic monitoring system 100 of FIG. 3.

As shown by FIG. 4, the controller 110 may comprise one or more processors 460 (e.g., a digital signal processor or central processing unit), a memory 410, an input output (I/O) interfaces 470, clock 490, and a power source 480 connected through a local interface 460 (e.g., a system bus). The memory 420 may store sensor data 420 from the sensors 120 (FIG. 3) and detection logic 430. Sensor data 420 may come in a variety of forms depending on the type of sensors 120 used and how the sensor data is transmitted to the controller 110. The detection logic 470 is configured generally to control the operation of the controller 110, as described herein. In the embodiment shown by FIG. 4, the detection logic 470 is implemented in software and stored in memory 420, but the detection logic 470 may be implemented in hardware or some combination of hardware, software, and/or firmware in other embodiments.

If desired, the controller 110 may share hardware resources with other components of the system 100, including but not limited to one or more processors 410, memory 420, and power source 480. As an example, a solar panel 124 of a sensor 120 may serve as a power source 410 for the controller 110.

Figure 5A:
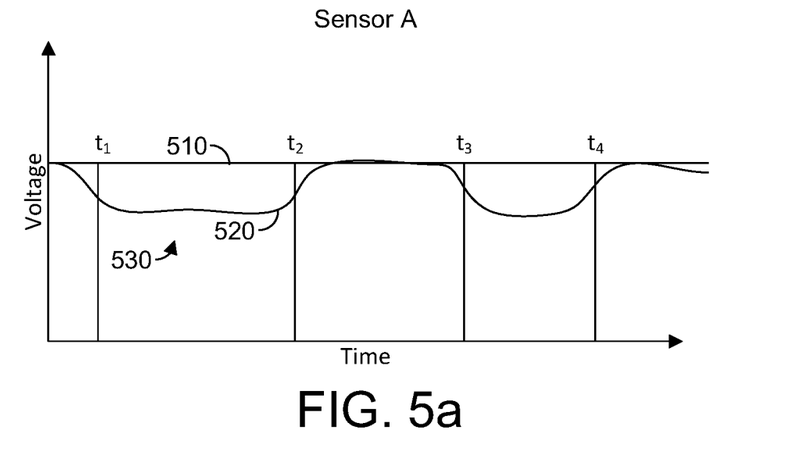
FIG. 5a is an exemplary graph of voltage versus time for the output of a first sensor for a traffic monitoring system, such as is depicted by FIG. 3.

In some embodiments, a single sensor 120 may be connected to a controller 110. From the single sensor 120, the controller 110 may configured to detect a vehicle signature within the sensor data. As an example, the sensor 120 might return data similar to that shown in FIG. 5 for "Sensor A." As shown, the sensor 120 may return voltage values defining a curve 520 over time that generally fluctuates from a relatively high level 510 (when the sensor 120 is not shaded by a vehicle 150) to substantially lower values (when the vehicle 150 shades the sensor 120, such as when the vehicle 150 passes over the sensor 120). These lower values define a trough 530 in the curve 520. As shown by FIG. 5, there may be multiple troughs as the sensor 120 is shaded by different objects (e.g., different vehicles 150).

The points of the curve 520 at or near the relative high level 510 may indicate that the solar sensor 120 is not shaded by a vehicle 150. Note that this relative high level 510 may slowly change over time (e.g., as the position of the sun changes throughout the day, as the weather changes, etc.). For example, overcast days would likely have a lower relative high position 510 than sunny days. Moreover, detecting a vehicle signature may be based on the amount of change in the curve 520 forming a trough.

As an example, a given trough 530 may be identified as a possible vehicle signature if the amount of voltage drop for the trough 530 exceeds a threshold, such as a predefined percentage of the relative high level 510. Further, the width of the trough 530 may be used as a characteristic to identify the trough as a vehicle signature. For example, there may be an expected range of times that a vehicle 150 may take to pass over the sensor 120. If the width of a trough is too short (which might suggest a speed that is unrealistically high or otherwise unexpected if it is assumed that the trough is caused by a shadow of a passing vehicle 150), then it may be assumed that the trough is not consistent with a signature of a vehicle 150. As an example, such a trough may be from a shadow of a different object, such as a flying bird or blowing tree.

If the width of a trough is too long (which might suggest a speed that is unexpectedly slow if it is assumed that the trough is caused by a shadow of a passing vehicle 150), then it may be assumed that the trough is not consistent with a signature of a vehicle 150. As an example, such a trough may be from a shadow of a different object, such as a cloud that is slowly passing. In some embodiments, the controller 110 may identify a trough 530 as a vehicle signature if the voltage change for the trough 530 exceeds a threshold and has width or duration that is within an expected range for a traveling vehicle 150.

Figure 5B:
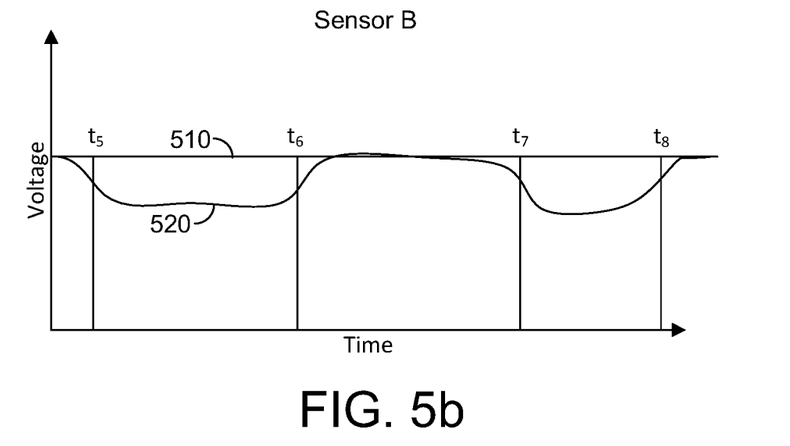
FIG. 5b is an exemplary graph of voltage versus time for the output of a second sensor for a traffic monitoring system, such as is depicted by FIG. 3.
Figure 6:
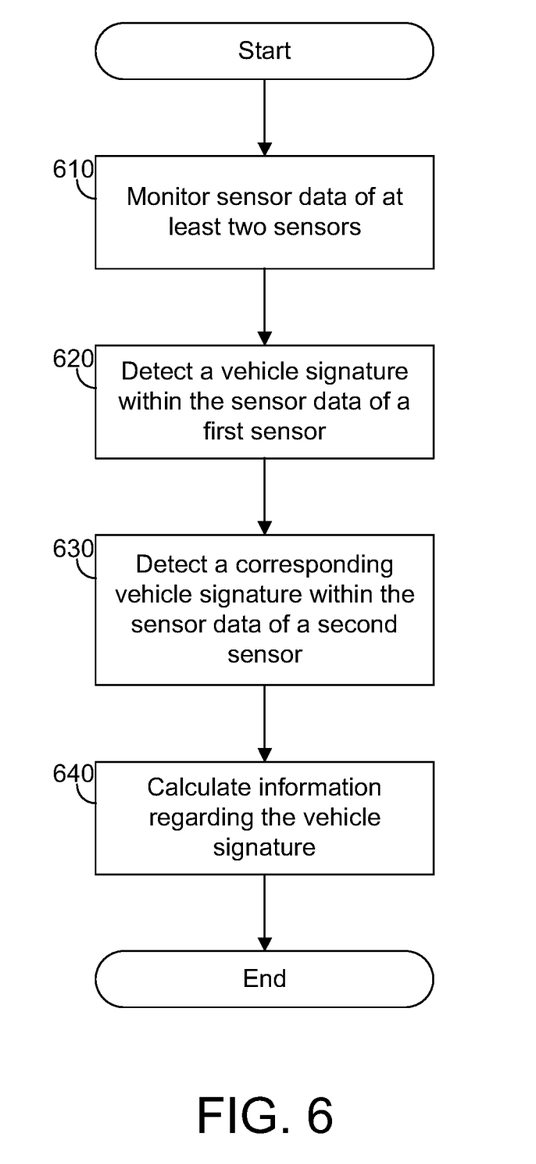
FIG. 6 is a flow chart illustrating an exemplary method for determining vehicle characteristics using a traffic monitoring system, such as is depicted by FIG. 3.

Further, when multiple sensors 120 are used, then identification of a trough 530 as a vehicle signature may be based on whether there is a corresponding trough 530 detected by another sensor 120. In this regard, if a vehicle 150 passes over two sensors 120 that are sufficiently close to one another (e.g., a few feet) so that a change of speed of the vehicle 150 between the two sensors 120 is unlikely, then it is to be expected that the shadow of the vehicle 150 will form a similar trough 530 in the output of each sensor 120. Thus, a trough 530 from one sensor 120 may be identified as a vehicle signature when the voltage drop of the trough is in a certain range, the width of the trough is in a certain range, and/or there is a corresponding trough (e.g., a trough of similar voltage drop and width) in the output of another sensor 120 within a certain time period of the trough 530 being identified. In other embodiments, other techniques may be used to identify a vehicle signature in the sensor data of a sensor 120.

Note that the sensors 120 may be configured to detect parameters other than light that would be affected by a shadow from a passing vehicle 150. As an example, as described above, reflections of an ultrasonic signature may be analyzed to find a signal pattern indicative of a vehicle signature. The analysis of such ultrasonic returns may be similar to the analysis of light described above except that there might be an expected increase rather than a decrease in the measured values when a vehicle 150 is passing. That is, the vehicle 150 may reflect ultrasonic energy so that a greater amount of ultrasonic energy is detected when a vehicle 150 is over or otherwise near the sensor 120. Moreover, identification of a vehicle signature in the sensor data may be based on the types of sensors 120 used and the type of information provided by the sensors 120.

In some embodiments, a plurality of sensors 120 may be in communication with the controller 110. Many of the principles discussed earlier for embodiments having a single sensor 120 may also apply to embodiments with multiple sensors 120. The controller 110 may detect a signature of a vehicle 150 within the sensor data of multiple sensors 120, as described above. The use of multiple sensors 120 may provide several benefits.

For example, using multiple sensors 120 may allow the determination of vehicular speed based on the time difference between a signature of the vehicle 120 in the sensor data of one sensor 120 and a signature of the same vehicle 120 in the sensor data of another sensor 120. For example, as shown in FIG. 5, sensor readings from two different sensors 120 (i.e., "Sensor A" and "Sensor B") are depicted graphically. In Sensor A's readings, at about time $t_1$, a vehicle signature begins which lasts until time $t_2$. This vehicle signature is marked by a transition of the curve from a high voltage value to a low voltage value at about the time $t_1$ and a transition of the curve from a low voltage value to a high voltage value at about the time $t_2$. In Sensor B's readings, a similar sized and shaped vehicle signature exists starting at about time $t_5$ to about time $t_6$. This vehicle signature is marked by a transition of the curve from a high voltage value to a low voltage value at about time $t_5$ and a transition of the curve from a low voltage value to a high voltage value at about time $t_6$.

Using techniques described above, the controller 110 may analyze the sensor data from Sensors A and B and determine that the signature from about $t_1$ to about $t_2$ is for the same vehicle 150 as the signature from about $t_5$ to about $t_6$. This decision may be based on various factors, such as by comparing the profiles (widths and amount of voltage drop) of the two signatures and the separation in time of the two signatures. In this regard, based on the separation distance of Sensor A and Sensor B, it can be expected that the signature for the vehicle 150 from Sensor B will occur within a certain window of the signature for the same vehicle 150 from Sensor A. If the profiles of the two signatures have characteristics that (1) are expected for a vehicle (2) are sufficiently similar and (3) occur within a certain window of time relative to each other, then the controller 110 may determine that the two signatures are for the same vehicle 150.

Once the controller 110 has identified signatures of the same vehicle 150 from two sensors 120, the controller 110 may calculate the vehicle's speed based on the timing difference between corresponding points of the two signatures. In the context of this disclosure, a corresponding point generally refers to a point of a signature representing approximately the same point of the vehicle 120. In this regard, the points along a trough 530 formed by a vehicle 150 generally represent points along the length of the vehicle 150 where the leading edge of the trough 530 represents the leading edge of the vehicle 150 and the trailing edge of the trough 530 represents the trailing edge of the vehicle 150. For example, points of the curves 520 at $t_2$ and $t_6$ both represent the same point of the vehicle 150 near its leading edge and thus are corresponding. Also points of the cures 520 at $t_1$ and is both represent the same point of the vehicle 150 near its leading edge and thus are corresponding.

If the distance (d) between the two sensors is known, then the controller 110 may determine the vehicle speed (S) by dividing the distance (d) by the difference in time between corresponding points (e.g., $t_5-t_1$ or $t_6-t_2$). If the speed of the vehicle 150 is known, then the length (L) of the vehicle 150 may be determined by multiplying the speed by the width of one of the signatures (e.g., $t_2-t_1$ or $t_6-t_5$). Note that the distance between the sensors 120 may be measured and provisioned into the controller 110 at installation or some other time.

As noted above, the information determined by the controller 110 can be used in various ways. As an example, the data determined for a vehicle 150 can be combined with data determined for other vehicles to calculate various traffic statistics, such as average speed of vehicles 150, number of detected vehicles 150 in a certain time frame, or average lengths of vehicles 150. Further, the lengths of the vehicle 150 may be used to determine vehicle type, such as to distinguish between eighteen wheelers and smaller-sized vehicles. In some embodiments, controllers 110 from multiple systems 100 may transmit vehicular information to a remote server 200 that performs further analysis and calculations to determine statistics and information about traffic patterns (see FIGS. 7-8). Any such information may be displayed to one or more users at any time to provide such information.

Figure 7:
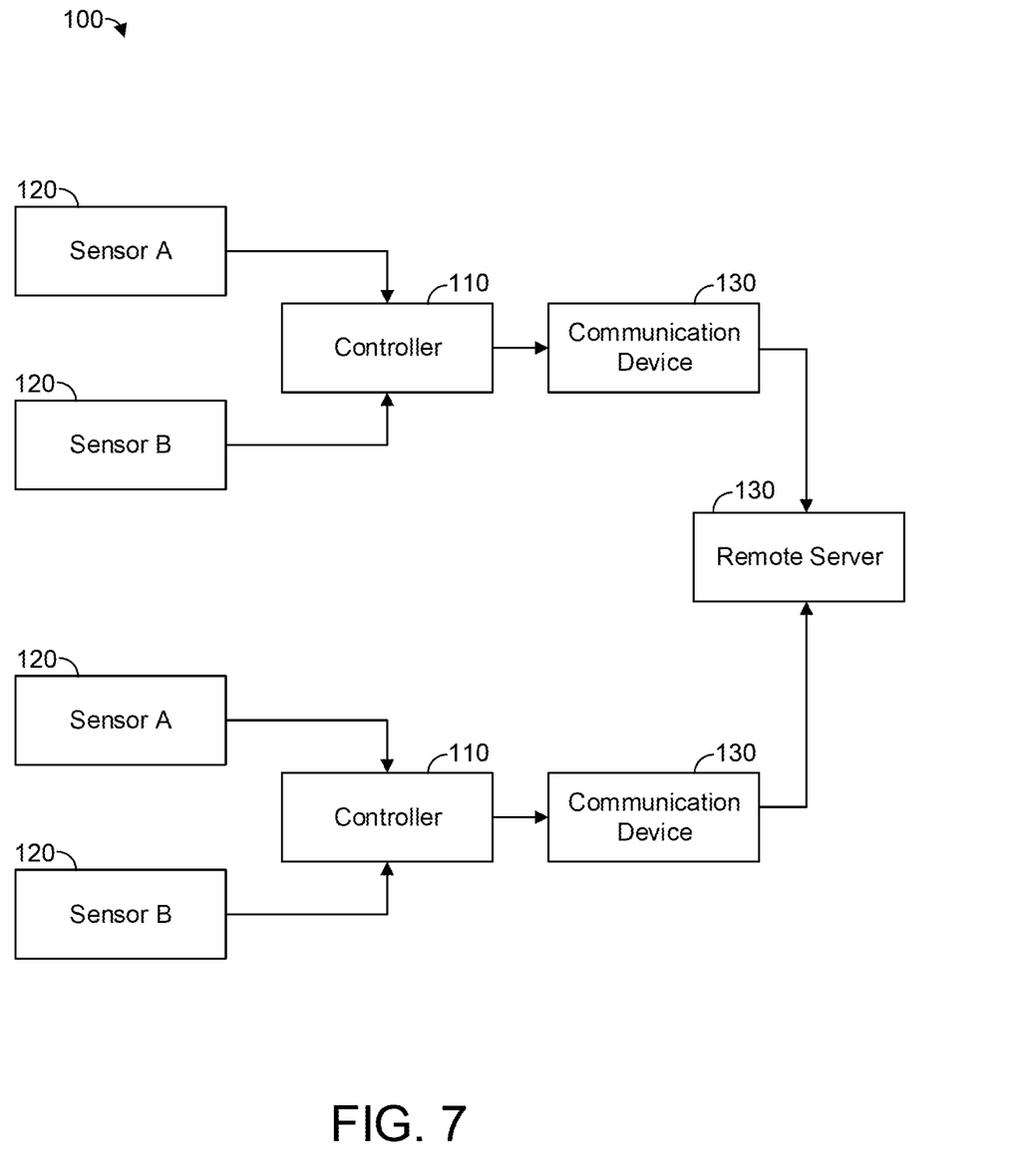
Figure 8:
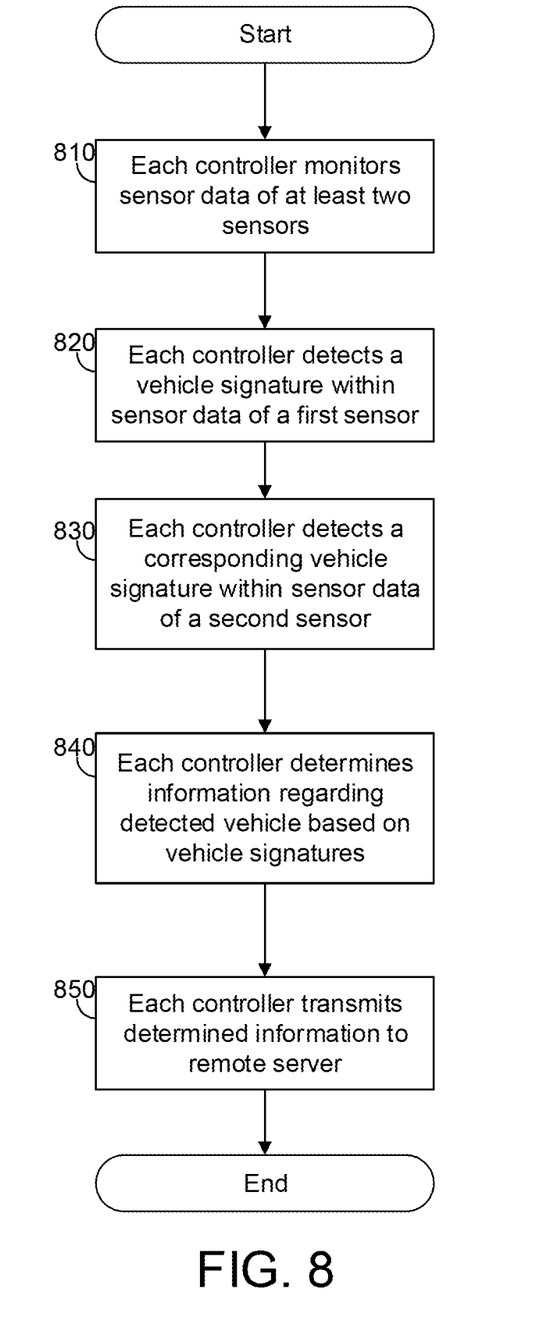

FIG. 8 is a flow chart illustrating an exemplary method for determining vehicle characteristics using a combination of at least two traffic monitoring systems 100, such as is depicted by FIG. 7. At step 810, each controller 110 of each traffic monitoring system 100 monitors its sensor data of its at least two sensors 120. At step 820, each controller 110 detects a vehicle signature within its sensor data of its first sensor 120. At step 830, each controller 110 detects a corresponding vehicle signature within its sensor data of a second sensor 120. At step 840, using the identified information, each controller 110 determines information regarding its respective detected vehicle based on each of the detected signatures (e.g., each vehicle speed and/or length). At step 850, each controller 110 transmits the determined information regarding its respective detected vehicle, via each controller's communication device 130, to a remote server 200 for further analysis and calculations.

FIG. 8 is a flow chart illustrating an exemplary method for determining vehicle characteristics using a combination of at least two traffic monitoring systems 100, such as is depicted by FIG. 7. At step 810, each controller 110 of each traffic monitoring system 100 monitors its sensor data of its at least two sensors 120. At step 820, each controller 110 detects a vehicle signature within its sensor data of its first sensor 120. At step 830, each controller 110 detects a corresponding vehicle signature within its sensor data of a second sensor 120. At step 840, using the identified information, each controller 110 determines information regarding its respective detected vehicle based on each of the detected signatures (e.g., each vehicle speed and/or length). At step 850, each controller 110 transmits the determined information regarding its respective detected vehicle, via each controller's communication device 130, to a remote server 200 for further analysis and calculations.

As has been discussed previously these concepts may be assembled in different ways to produce different useful solutions. For example, a single sensor 120 embodiment may be placed on a road 140 (e.g., highway or other type of road). Throughout the course of a day, a stream of vehicles 150 (e.g., cars, trucks, etc.) may pass over the sensor 120. As each vehicle 150 passes over the sensor 120, the vehicle 150 blocks at least some sunlight that would otherwise reach the sensor 120, and the amount of light detected by the sensor 120 decreases. After the vehicle 150 passes the sensor 120 so that it no longer blocks sunlight from reaching the sensor 120, and the amount of light detected by the sensor 120 increases. The controller 110 detects a vehicle signature within the sensor data based on the temporary increase in sensed light and may increment a vehicle counter. The controller 110 may transmit the information (e.g., vehicle count) to a remote server 200 via the communication interface 130.

In a two sensor example, the controller 110 may be configured to count vehicles 150, as described above for the single sensor example. In the two sensor example, a vehicle 150 passes over a first sensor 120 than thereafter passes over a second sensor 120. Thus, the vehicle 150 casts a shadow on the first sensor 120, thereby causing a temporary drop in the amount of light sensed by the first sensor 120, and vehicle 150 thereafter casts a shadow on the second sensor 120, thereby causing a temporary drop in the amount of light sensed by the second sensor 120. The controller 110 detects a vehicle signature in the sensor data of the second sensor 120 corresponding to the vehicle signature in the sensor data of the first sensor 120. Using the known distance between the first and second sensors 120, the controller 110 may determine one or more characteristics of the vehicle 150 (e.g., speed, length, direction, etc.).

The sensing and monitoring techniques have been described above in the context of providing a traffic monitoring system. Note that it is possible to provide sensing and monitoring for other environments and other types of resources. As an example, sensors 120 may be placed on or in airport runways, factory floors, or other locations over which traffic (e.g., people or vehicles) passes. The sensing and monitoring techniques may be used in other contexts in other examples.

In addition, in various embodiments described above, the sensors 120 are described as sensing sunlight. However, it is possible for the sensors 120 to detect other types of light. As an example, one or more sensors may be configured to emit infrared light and sense reflections of the infrared light from vehicles, as described above for ultrasonic sensors. It is also possible for an infrared transmitter to be positioned where a vehicle passes between a sensor 120 that is configured to sense infrared light from the transmitter. As an example, the sensor 120 may be positioned on or in a roadway, as described above, and the transmitter may be positioned underneath a bridge or a streetlight or on a pole such that a passing vehicle blocks at least some of the infrared light from reaching the sensor 120. Other locations of a sensor 120 and the transmitter are possible to achieve a similar effect in other embodiments.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. For instance, the order of particular steps or the form of particular processes can be changed in some cases to perform equivalent steps. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A system for sensing vehicles on a road, comprising:
   a first photosensor and a second photosensor each positioned on or in the road at a first location, the first photosensor and the second photosensor each configured to sense light and to provide respective first sensor data indicative of the light sensed by the first photosensor and second sensor data indicative of the light sensed by the second photosensor;
   a third photosensor and a fourth photosensor each positioned on or in the road at a second location different from the first location, the third photosensor and the fourth photosensor each configured to sense light and to provide respective third sensor data indicative of the light sensed by the third photosensor and fourth sensor data indicative of the light sensed by the fourth photosensor;
   at least one first processor configured to identify a first transition in the first sensor data and a second transition in the second sensor data;
   at least one second processor configured to identify a third transition in the third sensor data and a fourth transition in the fourth sensor data;
   wherein the first transition is in response to a shadow cast on the first photosensor by a first vehicle traveling over or near the first photosensor on or in the road,
   wherein the second transition is in response to a shadow cast on the second photosensor by the first vehicle traveling over or near the second photosensor on or in the road,
   wherein the third transition is in response to a shadow cast on the third photosensor by a second vehicle traveling over or near the third photosensor on or in the road,
   wherein the fourth transition is in response to a shadow cast on the fourth photosensor by the second vehicle traveling over or near the fourth photosensor on or in the road,
   wherein the at least one first processor is further configured to detect the first vehicle based on the first transition and the second transition,
   wherein the at least one second processor is further configured to detect the second vehicle based on the third transition and the fourth transition,
   wherein the at least one first processor is further coupled to a first communication interface,
   wherein the at least one second processor is further coupled to a second communication interface,
   wherein the first communication interface is configured to transmit information indicative of the detected first vehicle, and
   wherein the second communication interface is configured to transmit information indicative of the detected second vehicle; and
   a remote server in communication with the first communication interface and the second communication interface to receive the transmitted information, the remote server configured to perform analysis and calculations on the transmitted information to determine traffic pattern information.

2. The system of claim 1, wherein the at least one first processor is further configured to count, based on the first sensor data, a number of vehicles passing the first photosensor, and wherein the transmitted information is indicative of the number.

3. The system of claim 1, wherein the at least one first processor is further configured to determine a speed of the detected first vehicle based on the first sensor data and the second sensor data, and wherein the transmitted information is based on the speed.

4. The system of claim 3, wherein the at least one first processor is further configured to determine the speed based on the first transition and the second transition.

5. The system of claim 4, wherein the at least one first processor is further configured to determine a delay between the first transition and the second transition, and wherein the at least one first processor is further configured to determine the speed based on the delay.

6. The system of claim 1, wherein the at least one first processor is further configured to determine a length of the detected first vehicle based on the first sensor data and the second sensor data, and wherein the transmitted information is based on the length.

7. The system of claim 6, wherein the at least one first processor is further configured to determine the length based on the first transition and the second transition.

8. The system of claim 7, wherein the at least one first processor is further configured to determine a delay between the first transition and the second transition, and wherein the at least one first processor is further configured to determine the length based on the delay.

9. The system of claim 1, wherein the at least one first processor is further configured to detect a first vehicle signature in the first sensor data and a second vehicle signature in the second sensor data, and wherein the at least one first processor is further configured to detect the first vehicle based on the first vehicle signature and the second vehicle signature.

10. The system of claim 9, wherein the at least one first processor is further configured to compare the first vehicle signature to the second vehicle signature.

11. The system of claim 1, wherein the first photosensor and the second photosensor are each positioned in a middle of a lane of the road.

12. The system of claim 1, wherein the at least one first processor is further configured to detect the first vehicle based on a comparison of values corresponding to the first transition and the second transition to a predetermined threshold value.

13. The system of claim 1, wherein the second photosensor is positioned on or in the road a predetermined distance from the first photosensor.

14. The system of claim 13, wherein the at least one first processor is further configured to determine at least one of a speed of the first vehicle, a length of the first vehicle, and/or a direction of travel of the first vehicle, based on the first transition, the second transition, and the predetermined distance.

15. A method for sensing vehicles on a road, comprising:
sensing light with a first photosensor and a second photosensor each positioned on or in the road at a predetermined first distance apart at a first location, thereby providing respective first sensor data indicative of the light sensed by the first photosensor and second sensor data indicative of the light sensed by the second photosensor;
sensing light with a third photosensor and a fourth photosensor each positioned on or in the road at a predetermined second distance apart at a second location different from the first location, thereby providing respective third sensor data indicative of the light sensed by the third photosensor and fourth sensor data indicative of the light sensed by the fourth photosensor;
identifying a first transition in the first sensor data caused by a shadow cast on the first photosensor by a first vehicle traveling over or near the first photosensor on or in the road and a second transition in the second sensor data caused by a shadow cast on the second photosensor by the first vehicle traveling over or near the second photosensor on or in the road;
identifying a third transition in the third sensor data caused by a shadow cast on the third photosensor by a second vehicle traveling over or near the third photosensor on or in the road and a fourth transition in the fourth sensor data caused by a shadow cast on the fourth photosensor by the second vehicle traveling over or near the fourth photosensor on or in the road;
detecting the first vehicle based on the first transition and the second transition and the second vehicle based on the third transition and the fourth transition;
based on the detecting, transmitting information indicative of the detected first vehicle and the detected second vehicle to a remote server via a first communication interface associated with the first photosensor and the second photosensor and via a second communication interface associated with the third photosensor and the fourth photosensor, respectively; and
determining traffic pattern information, with the remote server, by performing analysis and calculations on the transmitted information.

16. The method of claim 15, further comprising counting, based on the first sensor data, a number of vehicles passing the first photosensor, wherein the transmitted information is indicative of the number.

17. The method of claim 15, further comprising determining a speed of the detected first vehicle based on the first sensor data and the second sensor data, wherein the transmitted information is based on the speed.

18. The method of claim 17, wherein the determining the speed is based on the first transition and the second transition.

19. The method of claim 15, further comprising determining a length of the detected first vehicle based on the first transition and the second transition, wherein the transmitted information is based on the length.

20. The method of claim 15, further comprising:
detecting a first vehicle signature of the first vehicle in the first sensor data based on the shadow cast on the first photosensor by the first vehicle, and
detecting a second vehicle signature of the first vehicle in the second sensor data based on the shadow cast on the second photosensor by the first vehicle,
wherein the detecting the first vehicle is based on the first vehicle signature and the second vehicle signature.

* * * * *